US010948962B2

(12) United States Patent
Hwang et al.

(10) Patent No.: US 10,948,962 B2
(45) Date of Patent: Mar. 16, 2021

(54) INSERTION COUNTER FOR USB OUTLETS

(71) Applicant: ASTRONICS ADVANCED ELECTRONIC SYSTEMS CORP., Kirkland, WA (US)

(72) Inventors: Pey-Hua Hwang, Seattle, WA (US); Dennis P. Markert, Federal Way, WA (US); Aaron Clarke, Bothell, WA (US); David Perchlik, Redmond, WA (US); Reid Adriance, Mill Creek, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 111 days.

(21) Appl. No.: 15/894,480

(22) Filed: Feb. 12, 2018

(65) Prior Publication Data

US 2018/0253134 A1 Sep. 6, 2018

Related U.S. Application Data

(60) Provisional application No. 62/465,510, filed on Mar. 1, 2017.

(51) Int. Cl.
*G06F 1/28* (2006.01)
*G06F 13/38* (2006.01)
*G06F 1/26* (2006.01)
*H02J 7/00* (2006.01)

(52) U.S. Cl.
CPC ............... *G06F 1/28* (2013.01); *G06F 1/266* (2013.01); *G06F 13/382* (2013.01); *H02J 7/0042* (2013.01); *H02J 7/0047* (2013.01); *H02J 2207/30* (2020.01)

(58) Field of Classification Search
CPC .......... G06F 13/382; G06F 1/02; G06F 1/266; G06F 1/28; H01L 2224/48091; H01L 2924/00014; H01L 2224/48137; H01L 2224/48139; H01L 2224/73265; H02J 2207/30; H02J 7/0042; H02J 7/0047
See application file for complete search history.

(56) References Cited

U.S. PATENT DOCUMENTS

| 2014/0139345 A1* | 5/2014 | Baldwin et al. ......... H02H 3/16 340/650 |
| 2016/0097801 A1* | 4/2016 | Polland ................ H01R 13/665 324/538 |

FOREIGN PATENT DOCUMENTS

JP 2012190312 A * 10/2012 ............. G06K 17/00

* cited by examiner

*Primary Examiner* — Terrell S Johnson
(74) *Attorney, Agent, or Firm* — Wiggin and Dana LLP; Gregory S. Rosenblatt; Jonathan D. Hall (57) ABSTRACT

Disclosed is a system for aiding in determining when a power-providing outlet is ending its usable service life and is due for service or replacement. A connection detection unit and counting unit respectively monitor connection of a device to a port and maintain a connection count of connection events. For USB type C connections a cable or device resistance detection circuit can be used to determine if a USB type C device or cable has been connected. USB Type A and AC connections can be detected by mechanical or electrical mechanisms. When a connection has been detected a counter can be incremented or decremented to record a connection. A limit value can be set and compared to the connection count and a sensory or electronic indication can be made when the limit value is exceeded.

20 Claims, 7 Drawing Sheets

INSERTION COUNTER FOR USB OUTLETS

CROSS REFERENCE TO RELATED APPLICATION

The present application claims the benefit of U.S. Provisional Patent Application No. 62/465,510 filed Mar. 1, 2017 and titled "Insertion Counter for USB Outlets." The disclosure of U.S. 62/465,510 is hereby incorporated herein in its entirety.

FIELD OF INVENTION

The present disclosure is generally directed to managing the life cycle of power outlets and more specifically directed to monitoring the use count of Universal Serial Bus (USB) outlets or AC outlets.

BACKGROUND

Availability of electrical power, such as from standardized AC power outlets or by outlets with Universal Serial Bus (USB) Type-A or Type-C ports, has become an expectation in many settings where there is a large base of personal electronic device (PED) users. However, the connectors in these outlets have a finite life due in part to the wear-out of the electrical contacts and the eventual degradation of retention features. The frequency of use can vary widely, and the ability to predict and remedy the inevitable wear-out of an individual connector is an important aspect of maintaining that outlet's ability to continue providing the expected electrical power. Predictability is especially important in locations such as aircraft cabins, where replacement must be performed by certified personnel, and without disruption of scheduled air service.

SUMMARY

The present disclosure is directed to monitoring and counting the usage of USB connectors, AC power connectors, and other power-providing connectors, thereby facilitating their timely replacement. Data collection concerning ongoing usage allows improved reliability by enabling the timely replacement of outlets, thereby reducing the accompanying costs and disruptions to service that unexpected outages cause.

The following definitions apply with regard to AC or USB power outlets and are applied herein:

Outlet—An assembly or sub-assembly of a system providing electrical power, typically to Personal Electronic Devices (PEDs). An outlet may contain one or more of the following: An AC connector for standard AC electrical power cords to power adapters for PEDs such as laptops, a USB Type-A port with a connector or captive cable providing power to a connected PED, a USB Type-C port with a connector or captive cable which may additionally support USB Power Delivery, and the necessary circuitry, firmware, or software needed to support the outlet functions described herein.

Counting Unit—The functional block which counts and maintains a non-volatile connection count of connection events. The counting unit may be implemented within an outlet assembly or externally to the outlet assembly, and further may include software, hardware and/or firmware, alone or in combination.

Port Controller—A device that handles the communication in and out of an outlet.

USB Port—A functional block of circuitry complying with the USB Type-A or Type-C specifications.

The disclosed system includes components for counting the accumulated number of connections to an outlet. Connection detection may be accomplished using electrical and/or mechanical mechanisms as described further herein. The counting is accomplished in a non-volatile nature and the data associated with the count may be selectively queried. For the purposes of this application, connection count will mean a count updated by incrementing or decrementing a count value. For instance, a pre-set connection count may be employed that is decremented down for each connection until reaching zero. Alternatively, a pre-set connection count may be employed that is incremented until reaching a certain value.

In certain embodiments, a limit comparator may be included so that upon the connection count reaching a predetermined number of counts a signal is generated to inform the user or operator that the associated outlet or subunit thereof, should be serviced or replaced. Any combination of counter or limit initialization values may be chosen such that the specified number of counts is needed to reach the comparator limit value.

DETAILED DESCRIPTION

The disclosed system and method address the problem of being uncertain when it is time to service or replace power-providing interfaces. Data collection on the use of outlets allows the accurate determination of when those outlets require attention, increasing overall reliability and reducing unforeseen downtime.

Figure 1:
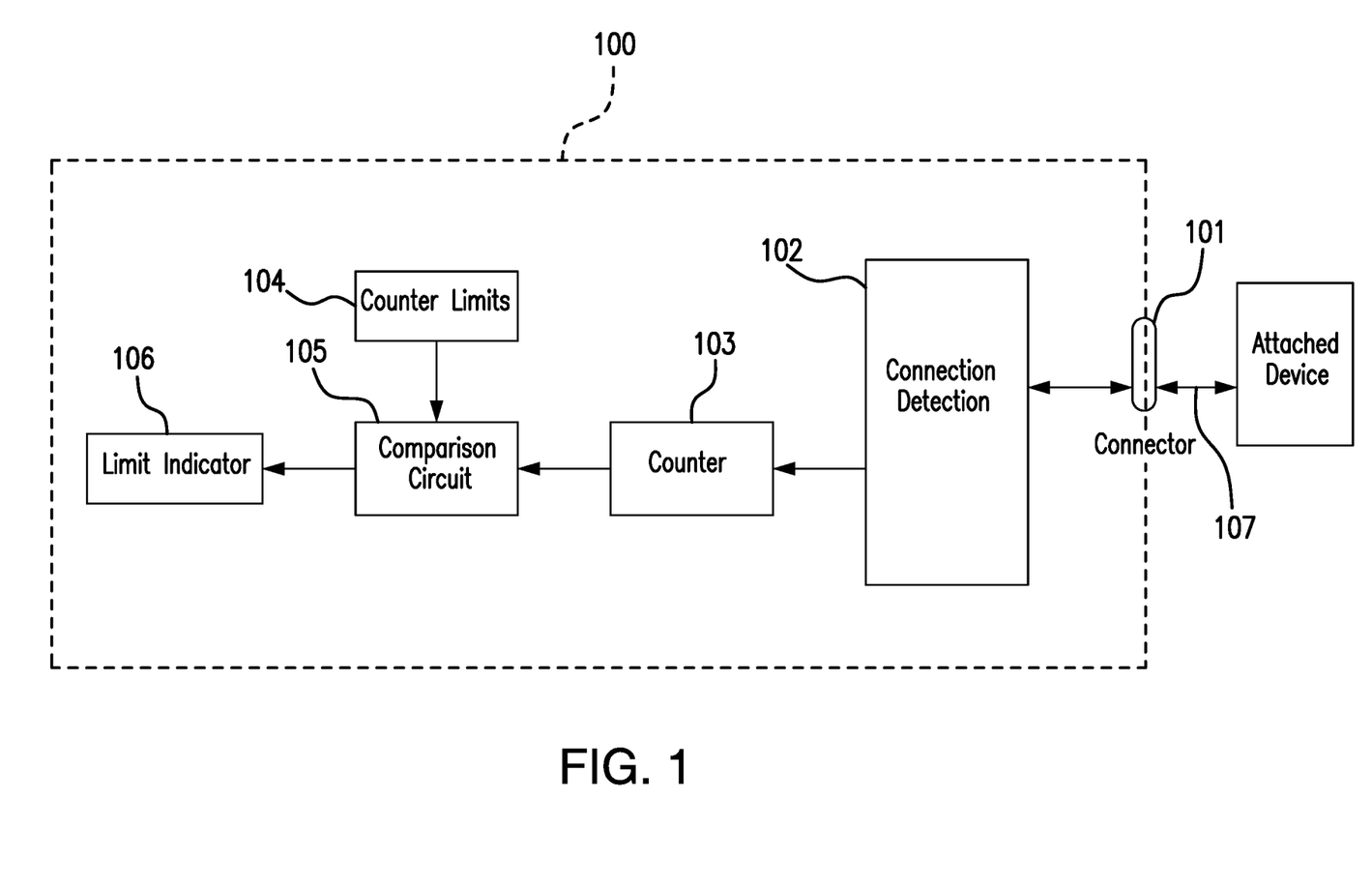
FIG. 1 is a block diagram of an embodiment with a limit comparator.

FIG. 1 depicts a functional block diagram of an embodiment. Outlet assembly 100 has connector 101, detection unit 102, counting unit 103, stored counter limits 104, comparison unit 105, and limit indicator 106. When connection is made between a device 107 and connector 101, the connection detection unit 102 detects the use/connection and prompts counting unit 103 to increase a connection count. Detection may be accomplished via electrical and/or mechanical mechanisms as described herein. Connection detection includes detecting an insertion or an electrical connection. The term "connection count" will be used in this text to refer to the counting of connection detection. Certain embodiments may employ a comparison circuit 105 that compares the connection count to one or more counter limits 104. When the connection count reaches a predetermined level the comparison unit 105 may generate a limit indicator 106 to inform the user and/or operator that the connector 101 should be replaced. The limit indicator may be an analog or digital output, or a sensory indicator such as a LED or audible sound. The function blocks as identified above in FIG. 1 and the other drawings may optionally be implemented with circuitry components, or may be employed via firmware or software. Additionally, the functions of the individual blocks and circuitry described as within the assemblies disclosed herein may alternatively reside external to the assemblies.

It should be appreciated than many types of power-providing outlets may also be employed. Such outlets may include, without limitation, those for electric connectors sold as LIGHTNING connectors by Apple Inc. of Cupertino, Calif.

In certain embodiments, the connection count is retrieved as serial or parallel data, transmitted wirelessly or by wired means.

Figure 6:
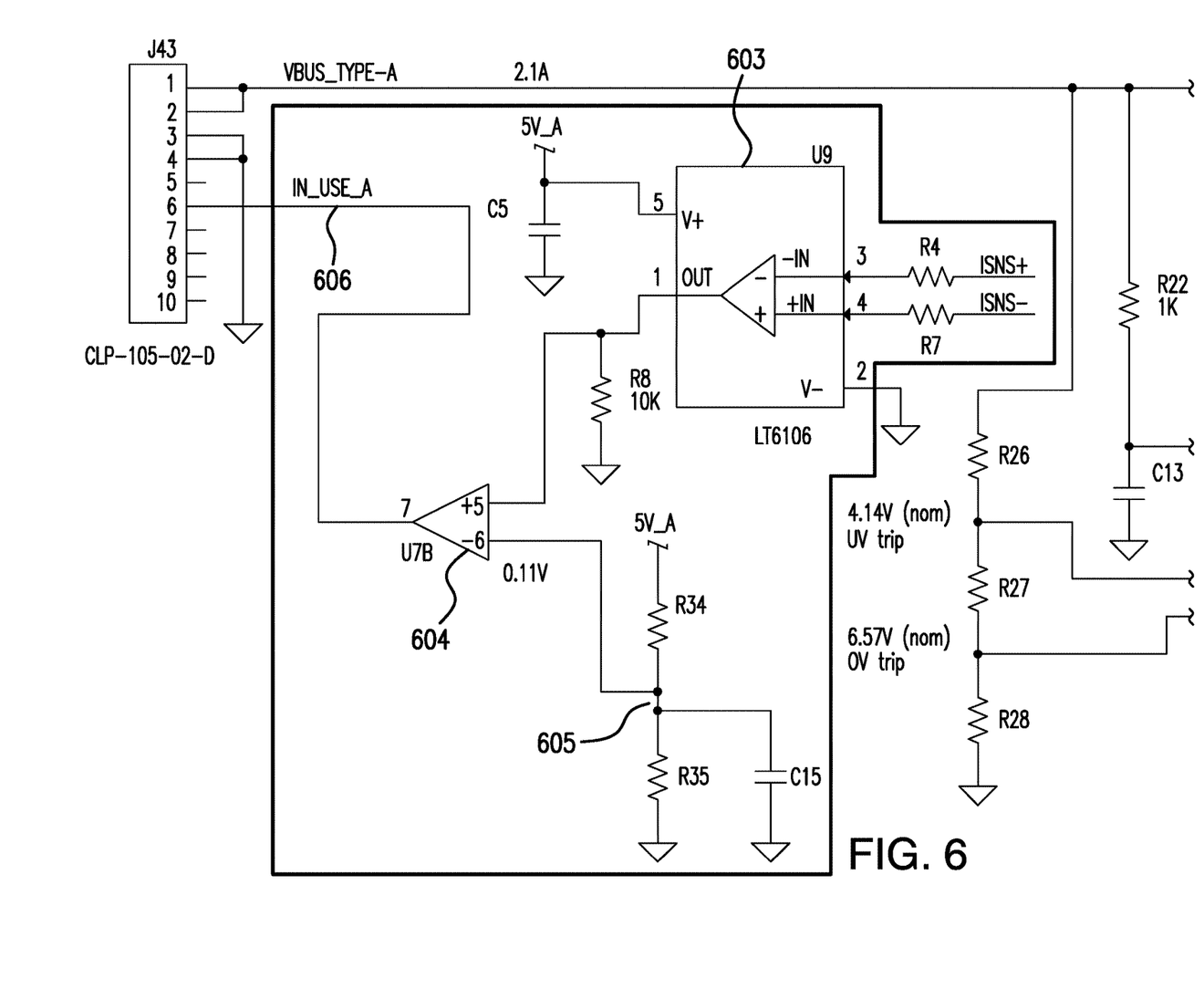
FIG. 6 is a Schematic showing an embodiment of a circuit used to detect the connection of a USB Type A device.

In certain embodiments, the connection count is determined by monitoring the electrical current provided to the electrical connector of the power-providing outlet. When a device is attached and draws current a circuit will detect the current flow and will send a signal to the connection counter indicating that a device is attached and drawing current and therefore the connection count should be increased. One such embodiment is shown in FIG. 6.

Figure 2:
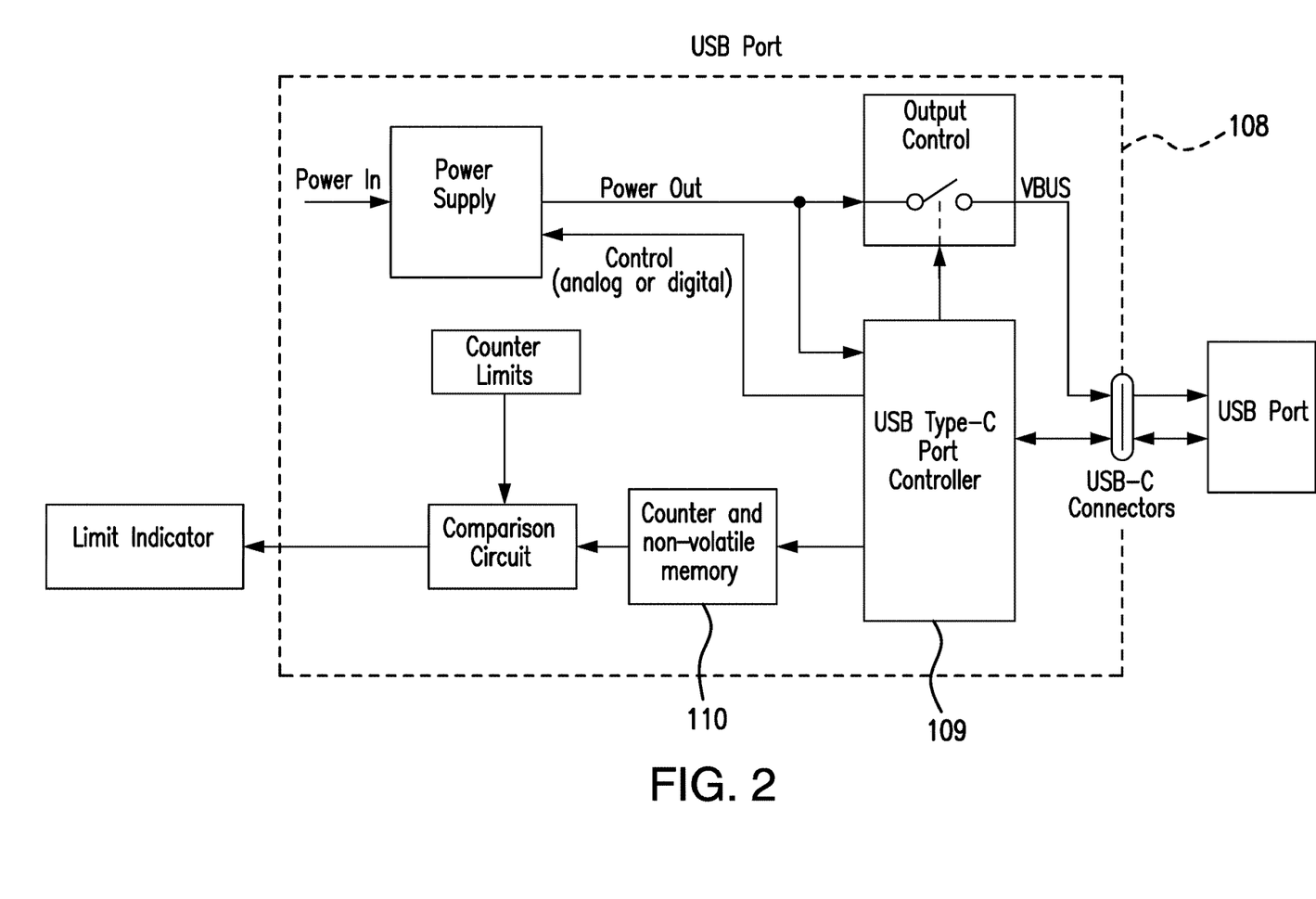
FIG. 2 is a block diagram of an embodiment with a USB Type-C Port.

FIG. 2 depicts a functional block diagram of a USB Type-C port 108. USB Type-C Port Controller 109 accomplishes the detection of a USB-Type C device per the USB Type-C specification. Port Controller 109 sends a signal to the counter 110 which increments or decrements the connection count and stores the connection count in non-volatile memory 110.

Figure 3:
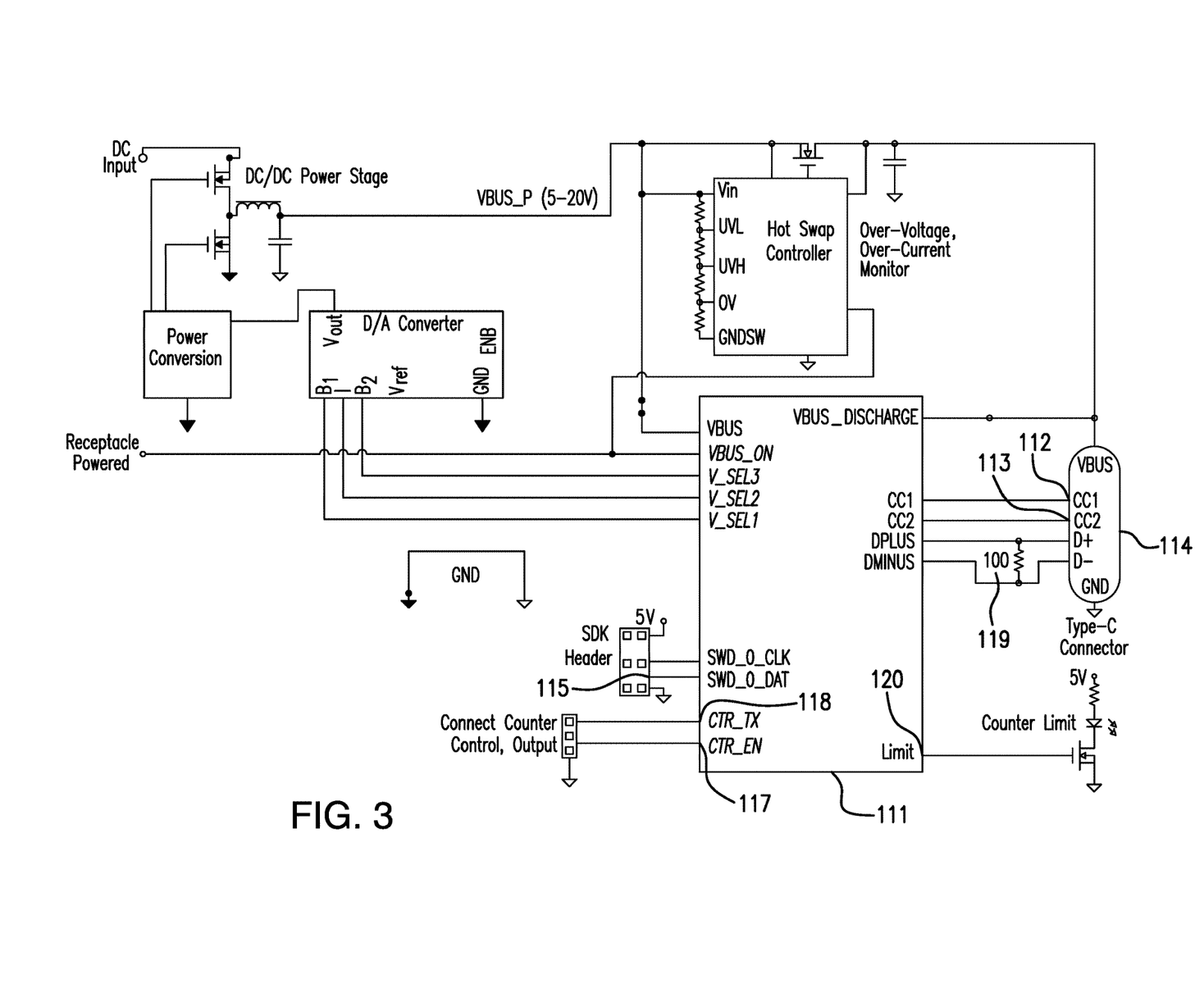
FIG. 3 is a simplified schematic electrical diagram of an embodiment device for a USB Type C outlet.

FIG. 3 is a schematic view of a demonstrated embodiment having a USB Type-C port that uses a USB Type-C port controller to detect the connection of a USB Type C cable.

The connect count for the embodiment may be initialized to a count, such as zero, upon installation or reloading of the Port Controller 111 firmware or software, or alternatively other firmware or software. Initialization of hardware counter implementations may occur during manufacturing. Several options are possible to reset the counter to its previously initialized value (which may optionally be zero, or a non-zero value). For example, when Type-C connector 114 is replaced the connection count could be reset by re-installation of the firmware or the count register could be reset by a reset command on a serial bus 115. Hardware-based counters may optionally be reset by the same means used during initial manufacturing.

Control input 117 allows for the connection count and transmission thereof to be enabled or disabled.

The connection count stored in memory could be transmitted using a communication protocol. FIG. 3 includes a CTR_TX function 118 that instructs the port controller 111 to transmit the Connection Count. The Connection Count transmission could be implemented on any communication bus, for example the serial interface 115 or via USB data lines 119.

Count limits may be set in separate hardware or firmware, as shown in FIG. 3, or may be set in the individual connection counter unit. These limits are compared against the connection count. In the case of an incrementing counter, when the count is greater than the counter limit the limit pin 120 will transition from a low to a high state. The limit pin 120 is connected to an LED circuit that illuminates an LED when the connection count is greater than the limit value. Shown in FIG. 3 is one embodiment, in other embodiments limit pin 120 could drive devices capable of emitting light, sound, vibration, or electromagnetic waves for remote monitoring.

Figure 4:
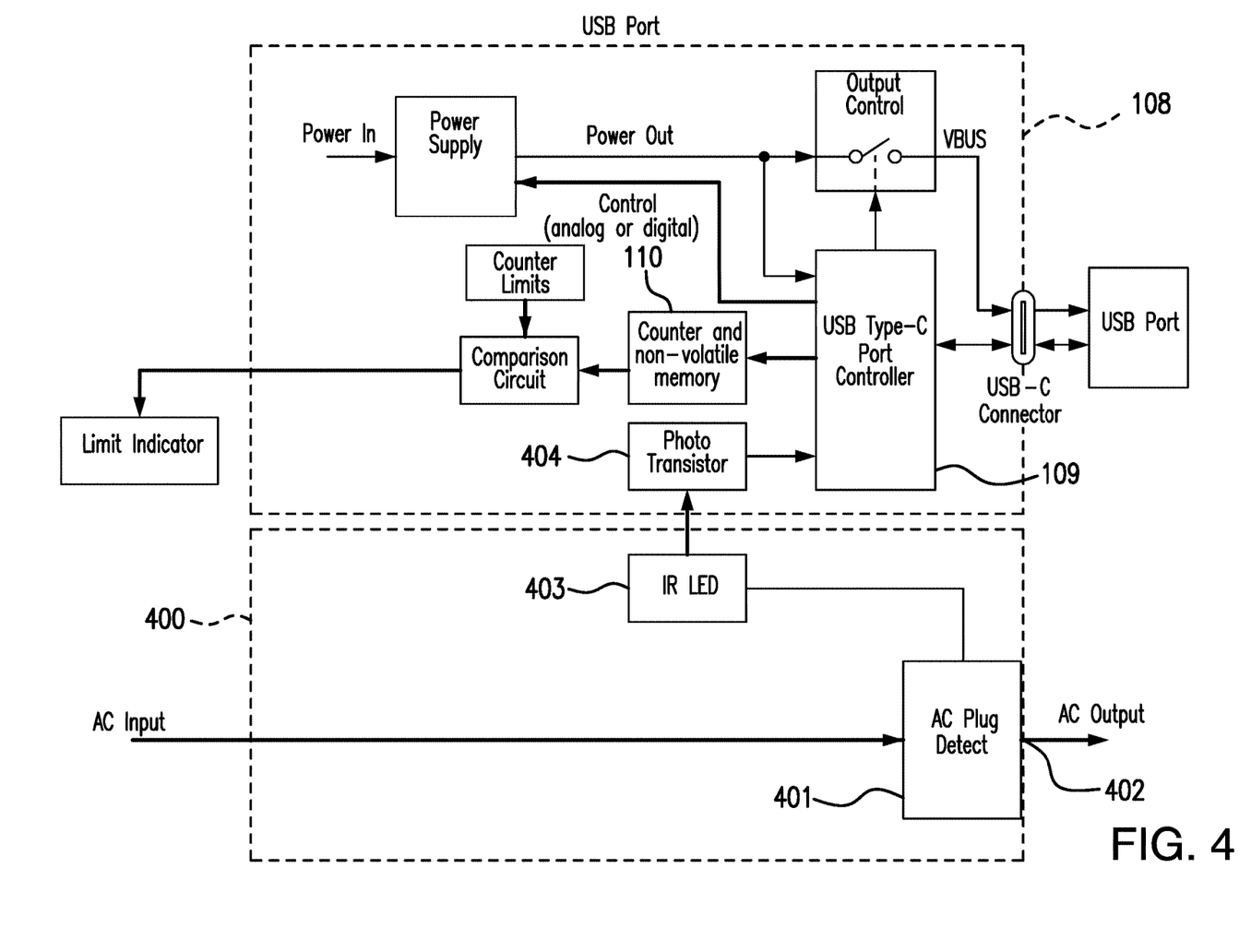
FIG. 4 is a block diagram of an embodiment of combined USB Type C and AC outlets with electrical isolation between the two.

FIG. 4 depicts a block diagram of an embodiment having a USB Type C Power outlet in combination with an AC power outlet. In this embodiment, there is USB Type C Port 108 as shown in FIG. 2, and an AC Port 400 with an AC connector 402. The AC Port 400 includes a detection mechanism to determine when an AC plug has been inserted into the AC connector 402. The detection mechanism 401 sends a signal to the USB Port controller though an electrically isolated channel. In FIG. 4 the electrical isolation is demonstrated with an infrared LED 403 and a photo transistor 404.

Figure 5A:
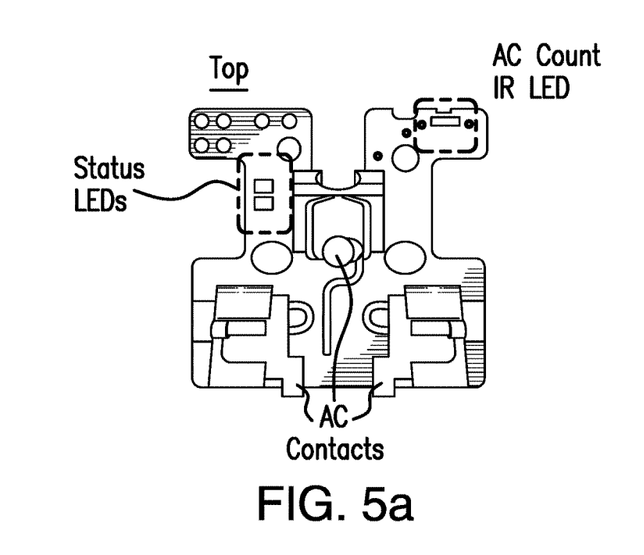
FIGS. 5a-c depict the layout of the embodiment of FIG. 4.
Figure 5B:
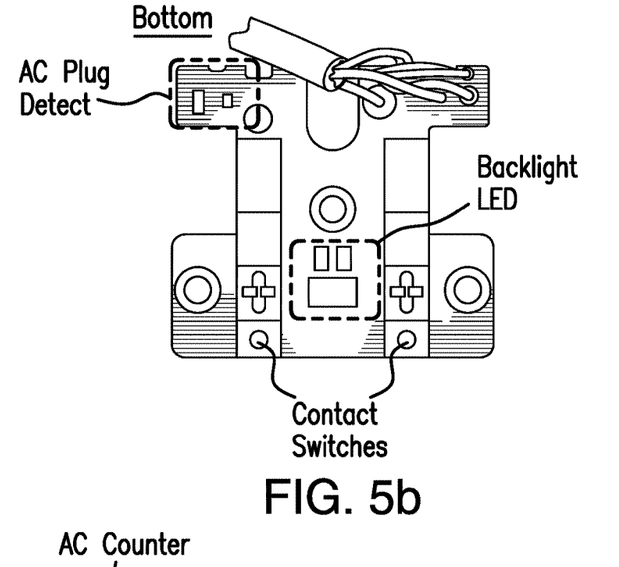
Figure 5C:
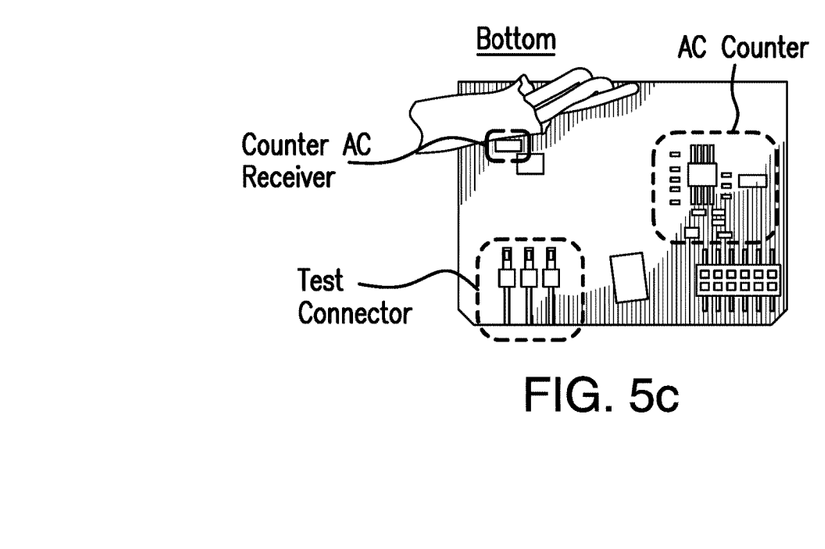

FIGS. 5A-C depict the physical embodiment of the functional block diagram shown in FIG. 4.

FIG. 6 is a schematic diagram depicting the implementation of an embodiment method of detecting the connection of a USB Type A device by detecting the current flow through the connector. A current sense resistor 601 in series with the output connector 602 will have an increased voltage with increased current resulting from a connected device. The voltage across the current sense resistor is amplified by an OP-AMP 603 and compared using a comparator 604 with a fixed reference 605. When the voltage exceeds the reference value, a signal 606 is sent to the other functional blocks as shown and described in FIG. 1, particularly counter 103, comparison unit 105 and indicator 106.

In certain embodiments, the counting unit is configured to provide a first alert when the incremental count reaches a first threshold and a second alert when the incremental count reaches a second threshold, wherein the second threshold is higher than the first threshold.

What is claimed:

1. An outlet system, including:
a Universal Serial Bus (USB) outlet assembly having contained therein a USB port and a counting unit including at least one of a cable resistance detection circuit, a mechanical mechanism and an electric mechanism;
wherein the counting unit is configured to detect a connection event when a USB device is connected to the USB port and update a non-volatile connection count regarding the connection events;
wherein the counting unit is configured to provide an indication when the connection count reaches a predetermined limit condition.

2. The USB assembly of claim 1 wherein the counting unit is configured to increment or decrement the connection count.

3. The USB assembly of claim 2 wherein the connection count maintained by the counting unit is electronically retrievable.

4. The USB assembly of claim 1 wherein the counting unit is configured to provide a first alert when the connection count reaches a first threshold and a second alert when the connection count reaches a second threshold, wherein the second threshold represents an additional number of connection events following those of the first threshold.

5. The USB assembly of claim 1 wherein the USB port is a Type-C port.

6. The USB assembly of claim 1 wherein the USB port is a Type-A port.

7. The system of claim 1 wherein the counting unit is selected from the group consisting of a cable resistance detection circuit, a mechanical mechanism and an electric mechanism.

8. A power-providing assembly, including:
a first power-providing outlet assembly;

a counting unit including at least one of a cable resistance detection circuit, a mechanical mechanism and an electric mechanism;

wherein the counting unit is configured to detect connection events wherein a first device connector is connected to the first power-providing outlet and maintain a non-volatile connection count of the connection events to the first power-providing outlet; and when the incremental count reaches a predetermined number of counts, providing a limit indicator.

9. The assembly of claim 8, further comprising:

a USB Type C port;

wherein the counting unit is further configured to detect connection events wherein a second connector is connected to the USB Type C port and maintain a non-volatile incremental count of the connection events to the USB Type C port.

10. The assembly of claim 9 wherein the first power-providing outlet is a USB Type A port.

11. The assembly of claim 8, further comprising:

a USB Type A port;

wherein the counting unit is further configured to detect connection events wherein a second connector is connected to the USB Type A port and maintain a non-volatile connection count of the connection events to the USB Type A port.

12. The system of claim 8 wherein the counting unit is selected from the group consisting of a cable resistance detection circuit, a mechanical mechanism and an electric mechanism.

13. A method of monitoring power-providing outlet lifecycle, including the steps of:

providing a first power-providing outlet assembly;

the outlet assembly including a counting unit including at least one of a cable resistance detection circuit, a mechanical mechanism and an electric mechanism;

detecting a plurality of connection events wherein a first connector is connected to the first power-providing outlet;

for each connection event, updating a non-volatile connection count by hardware or firmware or software means for the first power-providing outlet; and wherein the counting unit is configured to provide a first alert when the incremental count reaches a first threshold.

14. The method of claim 13 wherein the count maintained by the counting unit is electronically retrievable.

15. The method of claim 13 wherein the counting unit is configured to provide a second alert when the incremental count reaches a second threshold.

16. The method of claim 13 wherein the first power-providing outlet is one of a USB Type A port, a USB Type C port, or an AC power port.

17. The method of claim 13 further comprising:

providing a second power-providing outlet;

detecting a plurality of connection events wherein a second connector is connected to the second power-providing outlet; and for each connection event, updating a non-volatile connection count for the second power-providing outlet.

18. The method of claim 17 wherein the second power-providing outlet is one of a USB Type A port, a USB Type C port, or an AC power port.

19. The method of claim 13 wherein the counting circuitry unit includes a cable resistance detection circuit that detects the connection events.

20. The method of claim 13 wherein the counting unit is selected from the group consisting of a cable resistance detection circuit, a mechanical mechanism and an electric mechanism.

* * * * *